United States Patent [19]
Underhill

[11] Patent Number: 5,622,138
[45] Date of Patent: Apr. 22, 1997

[54] MULTI-CRATE PIG FARROWING FACILITY

[76] Inventor: Blair Underhill, P.O. Box 149, Delphi, Ind. 46923-0149

[21] Appl. No.: 375,480

[22] Filed: Jan. 19, 1995

[51] Int. Cl.[6] ............................... A01K 5/00; A01K 1/02
[52] U.S. Cl. .......................... 119/51.5; 119/508; 119/503
[58] Field of Search .............................. 119/18, 20, 51.5

[56] References Cited

U.S. PATENT DOCUMENTS

| | | | |
|---|---|---|---|
| 884,935 | 4/1908 | Lardinois-Pigeon . | |
| 1,044,605 | 11/1912 | Tolman . | |
| 1,895,127 | 1/1933 | Jensen . | |
| 2,188,017 | 1/1940 | Schlottmann . | |
| 2,255,806 | 9/1941 | Overson | 119/16 |
| 3,011,475 | 12/1961 | Golay | 119/20 |
| 3,028,097 | 4/1962 | Johnson . | |
| 3,762,372 | 10/1973 | Mente et al. | 119/16 |
| 4,175,515 | 11/1979 | Bradley | 119/16 |
| 4,217,859 | 8/1980 | Herring | 119/20 |
| 4,252,082 | 2/1981 | Herring | 119/20 |
| 4,348,986 | 9/1982 | Marrs | 119/20 |

FOREIGN PATENT DOCUMENTS

| | | | |
|---|---|---|---|
| 56336 | 7/1982 | European Pat. Off. | 119/20 |
| 513981 | 11/1992 | European Pat. Off. | 119/20 |
| 3600097 | 3/1987 | Germany | 119/51.5 |

*Primary Examiner*—Robert P. Swiatek
*Attorney, Agent, or Firm*—Richard G. Kinney

[57] ABSTRACT

An artificial sow apparatus that substitutes for a divider panel between the creep areas of adjacent farrowing crates and provides both heat and alternative food and liquid in close association with one another is described in two embodiments. In both embodiments, piglets from adjacent crates can cuddle against heated surfaces in close association with a gravity-fed solid pellet feed dispenser and a source of liquid. In the first embodiment, the heat is provided from a slanted wall of an enclosed heat-retaining, liquid-filled heater or radiator, and both the solid and liquid feed are available immediately above the heated surface (and are heated by the same radiator) in the form of a trough filled with feed pellets and artificial teats for dispensing liquid. In the second embodiment, both the liquid and solid feed are provided in adjacent troughs and heat is provided by a mat heater just below or just beside the troughs.

6 Claims, 3 Drawing Sheets

MULTI-CRATE PIG FARROWING FACILITY

FIELD OF THE INVENTION

The present invention relates to pig farrowing facilities and especially to weaning or artificial sow apparatus.

BACKGROUND OF THE INVENTION

Specialized pig farrowing facilities have come into common use by pig farmers. Examples of such facilities are shown in U.S. Pat. Nos. 4,217,859; 4,252,082; 4,348,986; and 2,255,806. Commercial units are available from DPC, Inc., U.S. 421, P.O. Box 149, Delphi, Ind., 46923. Such facilities commonly employ a number of adjacent crates wherein the sow is confined to a central area and the piglets are free to move into adjacent areas sometimes called creep areas on either side of the sow area.

The piglets as they are weaned eat solid, pelletized feed and are provided with liquid (which supplier is sometimes called a medicator, since the liquid often includes diluted medication). The feed medicator is commonly hung from the front or rear wall of the crate and the feed pellets placed in a shallow tray in the crate. Further, the side or creep areas are provided with a heater, often an electric heater mat laid on the floor, to provide a desired warm area for the piglets away from the sow. This arrangement can lead to unsanitary conditions occurring in the crates with solid food being spilled onto the floor and mixed with the piglets' excretion and/or the piglets excreting into the food tray. There, thus, is a need for a more sanitary way of feeding and medicating the piglets and for limiting the opportunity for food to be spilled onto the floor of the areas occupied by the piglets.

Another disadvantage of the prior systems is the need for frequent manual cleaning and refilling of the dry feed tray with the accompanying labor costs and inconvenience.

SUMMARY OF THE INVENTION

To overcome one or more of the disadvantages of the prior art, the present invention provides a divider wall structure between adjacent creep areas of adjacent crates, which wall structure includes a bin for dry piglet feed and a relatively small feeding trough or area that is mounted on the wall above the floor and from which the piglets can feed. The bin automatically feeds feed to the area as the piglets consume it. The wall structure further includes a liquid (medicator) reservoir and outlet from which the piglets may drink, with the outlet also being placed above the floor level to prevent or lessen spillage onto the floor. The base of the wall structure is heated so that the piglets can huddle against it in a similar manner to which they might huddle against their sow with the feeding outlets above the heated base so that the piglets are weaned away from the sow and to solid food from the wall structure that serves as an alternative sow by providing heat, drink and food.

One advantage of this alternative sow arrangement is that, unlike real sows, it cannot turn over and crush a piglet.

Another advantage of the invention, when applied as a divided wall, is that two litters of piglets can, one from each crate, feed from and huddle against the same structure.

A further advantage of a structure including the present invention is that it need be tended less as a larger quantity of food and drink is stored and automatically supplied to the piglets without the need for frequent refilling.

The invention, together with further advantages and features thereof, may best be understood by reference to the following description, taken in connection with the accompanying drawings, in the several figures of which like reference numerals identify like elements.

DETAILED DESCRIPTION OF THE PREFERRED EMBODIMENTS

Figure 1:
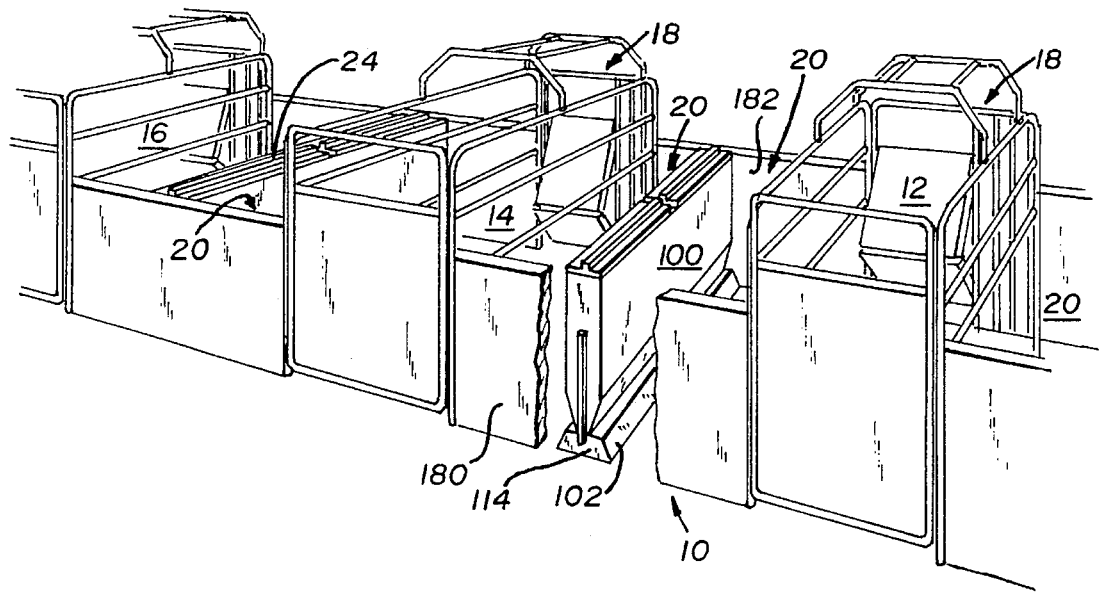
FIG. 1 is a perspective view of a portion of the invention of a farrowing facility which incorporates weaning apparatus, a divider panel, constructed in accordance with the principles of the present invention and shown with parts broken away to better illustrate the divider panel.

Referring to FIG. 1, there is depicted a farrowing apparatus generally designated by 10 which includes a number of adjacent pens or crates 12, 14 and 16, each of which comprises a central sow-confining enclosure 18 in which a sow is confined and adjacent creep areas 20 in which piglets are free to move but the sow may not enter. Thus, the piglets are free to move through the entire crate including the central enclosure 18 as well as the adjacent "creep" areas 20 but are otherwise confined to their crates 12, 14, or 16. Although three crates 12, 14 and 16 are shown in FIG. 1, it should be understood that a larger number of such crates can be arranged in a row of similar side-by-side crates and that two or more rows of such crates can be and often are arranged parallel to one another in an enclosure which is often termed a farrowing house. Also, the floors of the crates 12, 14, 16 as is conventional, are formed of wire mesh or the like porous material so that excretion tends to fall through the floors and to an area below for sanitary disposal and to aid in periodic cleaning by hosing or flushing with water of the crate.

The crates 12 and 14 are, in accordance with the present invention, provided with a weaning apparatus or unit 100 constructed in accordance with the principles of the present invention. The crates 12, 14, 16 and associated equipment may be otherwise entirely conventional and are not therefore here described in detail, it being understood that farrowing facilities such as those which are commercially available from the aforementioned DPC, Inc. firm and other firms, or as are disclosed in U.S. Pat. Nos. 4,348,986 or 4,252,082, may be employed. Such crates are typically of an overall size of about 7 feet by 5 feet in area.

The apparatus 100 serves as a dividing wall between the crates 12 and 14 and, in a row of a large number of crates, such a wall apparatus 100 would be provided at every other wall between the crates. That is, while a conventional wall 24 may be provided between the crates 14 and 16, the wall between the crate 16 and its adjacent crate would preferably be constructed and function as does the wall apparatus 100. That is, one apparatus such as the wall 100 serves two adjacent crates.

Figure 2:
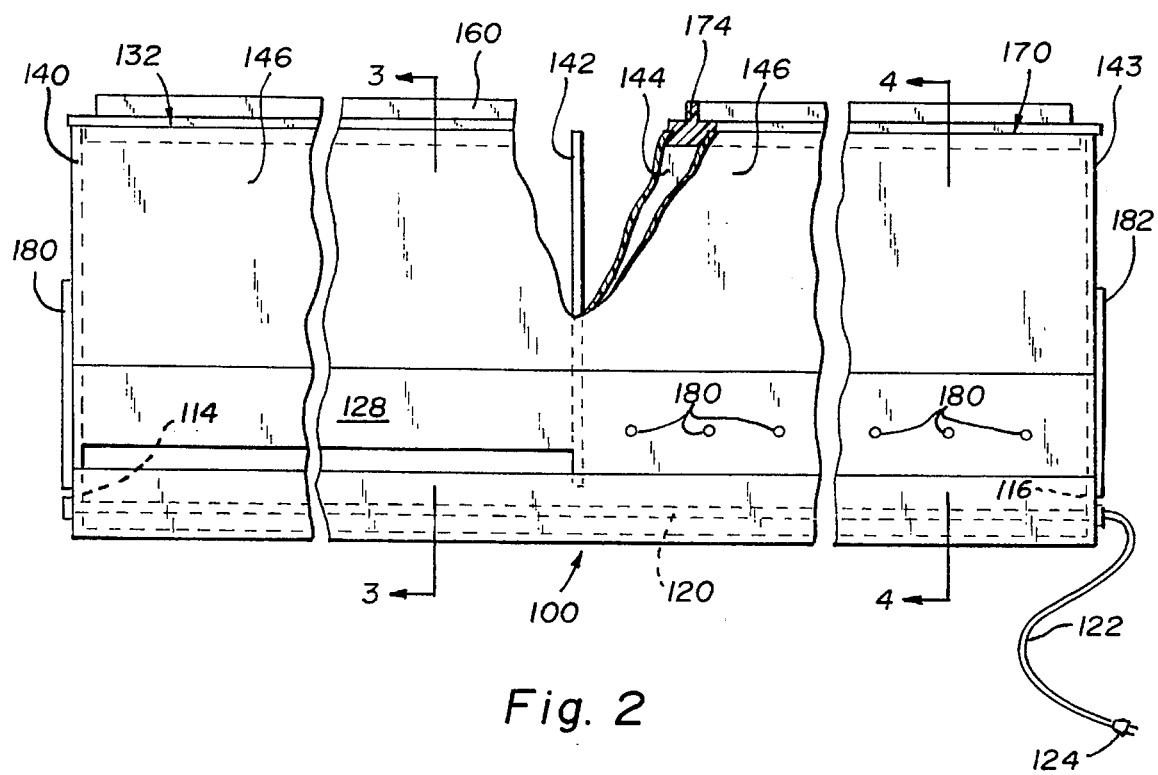
FIG. 2 is a side elevational view of the divider panel of FIG. 1.
Figure 3:
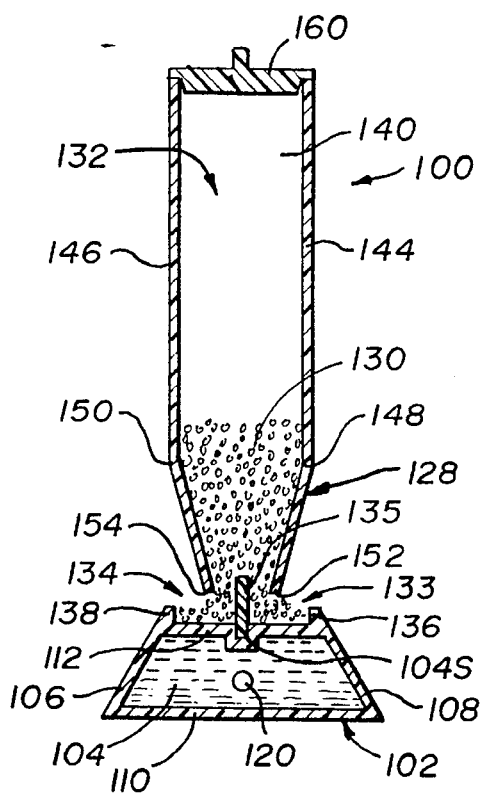
FIG. 3 is a sectional view of the panel of FIGS. 1 and 2 as seen from the plane defined by the line 3—3 of FIG. 2 when looking in the direction of the arrows associated therewith.
Figure 4:
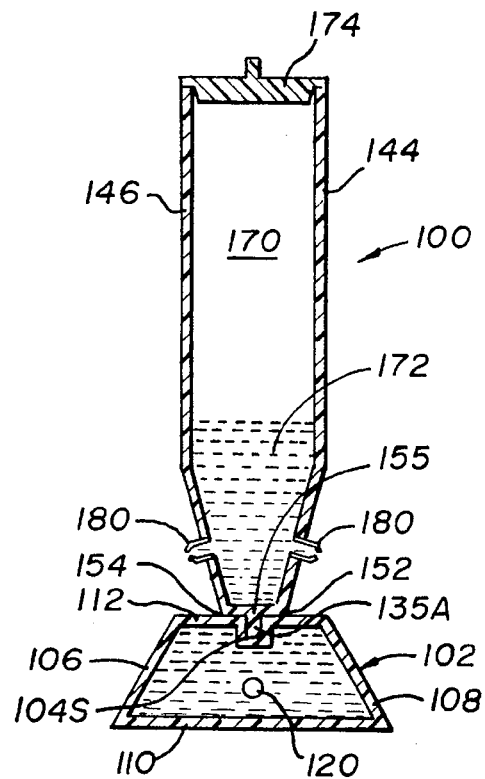
FIG. 4 is a sectional view of the panel of FIGS. 1 and 2 as seen from the plane defined by the line 4—4 of FIG. 2 when looking in the direction of the arrows associated therewith.
Figure 5:
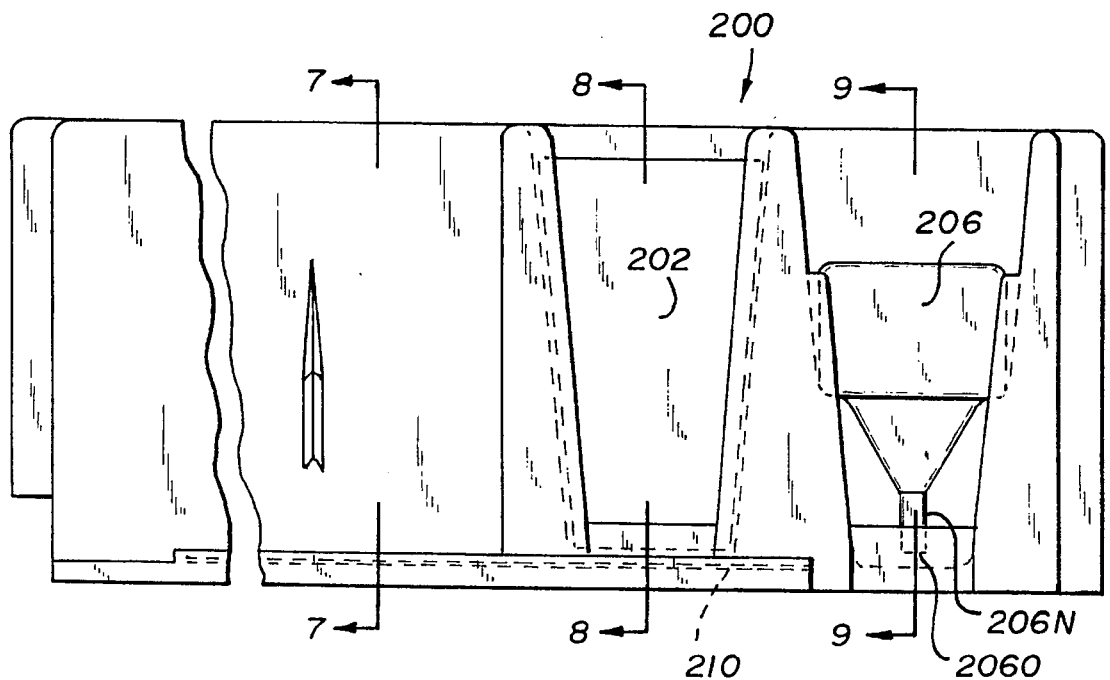
FIG. 5 is a side elevational view of a second divider panel constructed in accordance with the principles of the present invention.
Figure 6:
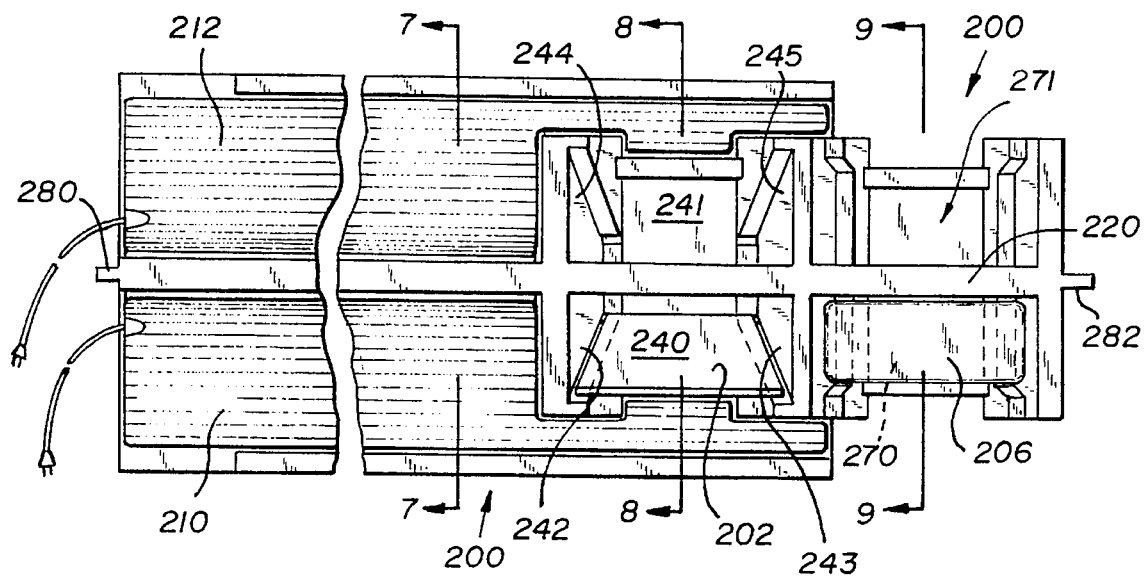
FIG. 6 is a top or plan view of the panel of FIG. 5.

As better shown in FIGS. 2–4, the apparatus 100 includes a base 102 which encloses a quantity of heat-retaining liquid 104 such as water and has slanted side walls 106, 108 against which piglets may cuddle. The base 102 is preferably made of a plastic material such as polyethylene and has a bottom wall 110 wider than its top wall 112 and is symmetric about its central vertical longitudinal plane. The base 102 has end walls 114, 116 (FIG. 2) which, together with the side walls 106, 108, top wall 112, and bottom wall 110, define an enclosed space which is preferably sealed against leakage and entirely or substantially entirely filled with heat-retaining liquid 104. The end wall 116 mounts an electric rod heater 120 which includes a temperature regulator. An example of such a heater is one made by Watlow of St. Louis, Mo., and marketed under the trademark Wat Rod, model number E52951. The heater 120 passes through the end wall 116 (in a manner such as to maintain the sealed condition of the liquid 104 chamber) and is powered by conventional electric current through a cord 122 and plug 124 (FIG. 2). In operation, the heater 120 serves to keep the water 104 at approximately 90 degrees F. and thus serves to keep the walls 106 and 104 at approximately the same temperature. A 150 watt electric heater has been found to be sufficient under normal conditions. As the base is approximately seven feet long and the water is maintained at approximately the same temperature by convention, a large warm surface without "hot spots" is provided for the piglets.

Mounted above the left side (as viewed in FIG. 2) of the base 102 is means 128 for dispensing piglet solid food pellets such as the pellets 130 shown in FIG. 3. This means 128 comprises a bin area 140 for holding a store of pellets 130 and a pair of trays or troughs 133, 134 from which the piglets eat. The troughs 133, 134 are formed by having the upper surface of the top wall lowered and formed by central vertical wall 135 and two parallel shortened extending walls 136, 138 which are formed in part by the upper end of the sections of the base 102. Similar end walls are formed at the longitudinal ends of the troughs 133, 134 serve to complete the tray and lessen spillage of the feed 130. The chamber 132 is defined by a pair of end walls 140, 142 (FIG. 2) and the side walls 144, 146. The wall 142 projects into and is received by a slot formed in the top of the base 102 (FIG. 2). As shown in FIG. 3, the side walls 144, 146 turn inward at 148, 150 to narrow the chamber 132 toward its bottom. The side walls 144, 146 end in edges 152, 154 which are spaced above the wall 112 and the floor of the troughs 133, 134. As piglets eat the feed 130 out of the troughs, the feed 130 flows downward by gravity out of chamber 132 to refill the troughs. A suitable removable cover 160 with a handle 170 is provided to close off the top of the chamber 132.

As shown in FIGS. 3 and 4, the upper portion of the wall unit 100 is secured, in part, to the base 102 by having a longitudinal slot 104S formed in the top wall 112 of the base 102 and having the walls 135, 135A extend into that slot.

As shown in FIG. 2, the same walls 142 and 144 continue along the length of the divided wall apparatus 100 and define two of the walls of a medicator 170 (FIG. 4). The medicator is a reservoir for containing liquid 172 which is often water plus medicine and thus the term medicator. The walls' 146, 144 bottom ends 152, 154 are here sealed to a wall 155 and the ends of the reservoir are enclosed by vertical walls 142 and 143 (FIG. 2). A reservoir removable cover 174 (FIG. 4) similar to the cover 160 encloses the chamber 170 and can be removed for filling and cleaning of the medicator 170.

Piglets can drink the liquid from the reservoir 170 from artificial teats 180 (FIG. 4 and FIG. 2) which may be those manufactured by Nutrisip, whose address is Kokomo, Ind., and sold under the trademark Lixit and model number WN 100. As such teats 180 are well known in this field, they need not be described in detail here. The teats 180 are positioned in the slanted end wall surface of the walls 144, 146 preferably about three inches above the base and about six inches above the floor of the creep area.

To aid in securing the divided wall unit 100 in place of conventional divided walls, vertical mounting apparatus 180, 182 (FIG. 2) are provided on the outside of the walls 140, 143 which fit into vertical slots in the crate walls 180 and 182 (FIG. 1). This allows for the units 100 to replace certain existing divider walls by simply being dropped in place and also allows for the entire unit 100 to be removed and replaced in case of repair or maintenance.

A prototype of the unit 100 has been constructed and tested and shown to work well. For purposes of definiteness of disclosure but not for limitation, the following approximate dimensions and materials are set out. Of course, the inventor may in the future decide to change these for reasons of economy or on the basis of further experimentation. (Also, the reader should double check these figures against transcription error by using the well-known methods of calculation.)

Base 100, approximately 83 inches in length, 9 inches in width at the bottom, and 5 inches in width at its top, and 3½ inches in height, made of about ¼ inch thick sheet polyethylene welded at all junctions.

The upper portion of the unit 100 was made of the same plastic sheeting with an overall height of approximately 17 inches above the base 102, 4½ inch wide at the top. The side walls were vertical for about 12 inches and tapered inward for about 4½ inches.

SECOND EMBODIMENT

A second embodiment 200 of the invention is shown in FIGS. 5–9. This unit 200 can be used in place of the unit 100 in the farrowing facility of FIG. 1. Unit 200 is formed from a single cast plastic unit plus received removable parts, namely, bin walls 202, 204 and reservoirs 206, 208 and removable flat heaters 210, 212.

Figures 7, 8:
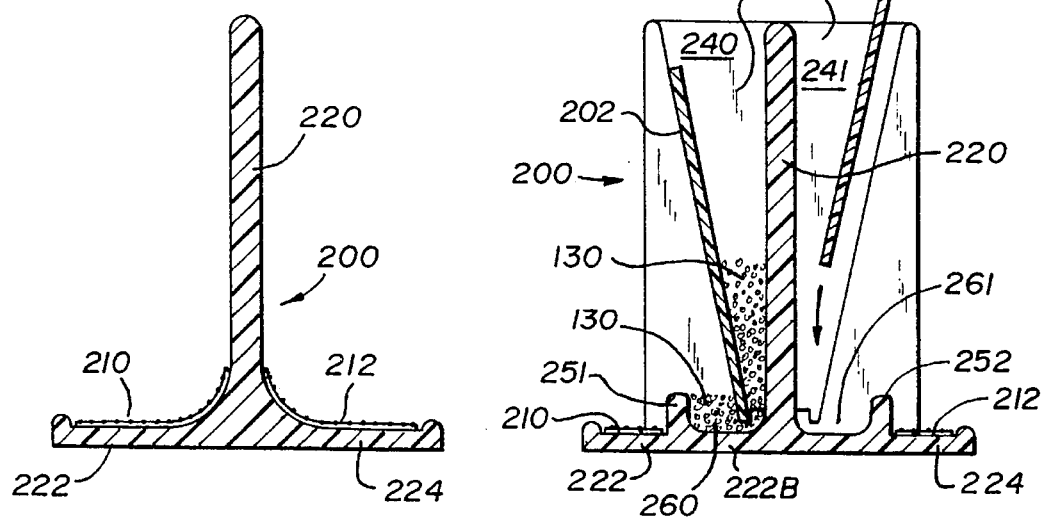
FIG. 7 is a sectional view of the panel of FIGS. 5 and 6 as seen from the plane defined by the lines 7—7 in both FIGS. 5 and 6 when looking in the direction of the arrows associated with those lines.
FIG. 8 is a sectional view of the panel of FIGS. 5 and 6 as seen from the plane defined by the lines 8—8 in both FIGS. 5 and 6 when looking in the direction of the arrows associated with those lines, with one additional part, a wall shown above its operational position for illustrating how that wall is inserted and removed from that operative position and with piglet feed shown in one portion of the panel.

In more detail, the divider 200 includes a pair of end supports 280, 282 similar to those of the first embodiment, a central wall 220, floor sections 222, 224 that extend for nearly the entire length of the unit 200 including the area in front of the automatic feeders 240, 241 which in this embodiment are defined by the wall 220, end walls 242, 243, 244 and 245, and removable front walls 202 and 204 which are positioned as indicated in FIG. 8. The bottom edge of these walls 202, 204 when positioned as shown in the left side of FIG. 8 are positioned a short distance above the base 222B and a front wall section 251, 252 positioned in front of that edge to define a feeding trough 260, 261 into which feed 130 may be fed by gravity from the bins 240, 241 when feed is removed from the trough 260, 261 by piglets.

Figure 9:
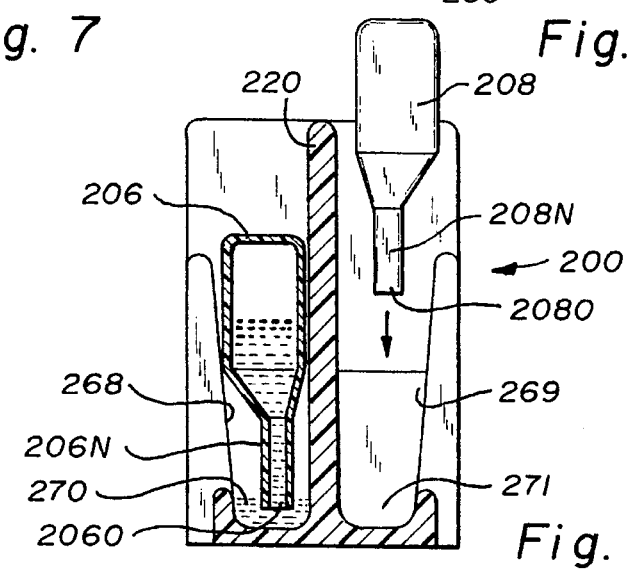
FIG. 9 is a sectional view of the panel of FIGS. 5 and 6 as seen from the plane defined by the lines 9—9 in both FIGS. 5 and 6 when looking in the direction of the arrows associated with those lines, with one additional part, a liquid reservoir, shown above its operational position and illustrating the manner of positioning it into its operational position.

Adjacent to the bin 240 and 241 along the wall 220 are means 268, 269 (FIGS. 5, 6 and 9) for receiving the medicator reservoirs 206, 208 and for defining water troughs 270, 271 into which the reservoirs can feed liquid as liquid is removed from the troughs 270, 271 by the piglets. The reservoirs in this case are closed vessels having a narrow neck 206N, 208N with their only opening 206O, 208O being at the end of the neck. These may be filled when inverted from the position shown in FIGS. 5, 6 and 9 and then inverted as shown in FIG. 9 and placed into the receiving framework 268, 269 as there shown.

The unit 200 is preferably approximately 84 inches in overall length, approximately 22 inches high, and about 18 inches at its widest. The solid feed troughs 260, 261 are approximately 6 inches by 4 inches with the walls 202, 204 cutting off about 1¼ inches to provide an approximately 6 inches by 2¾ inches feeding area. The water troughs 270, 271 are also approximately 6 inches by 4 inches. The wall 220 is approximately 1½ inch thick and the entire structure 200 except for the removed parts is preferably formed of 35 pound polyethylene. The bin insert 202, 204 walls are preferably about ¼ inch thick, about 7¾ inches wide at the bottom, and about 11¼ inches wide at the top. The heaters 210 and 212 may be Foil heaters, made by Omegalux of Stamford, Conn., under model number SSHB-1224, which may be cut or specially made to fit the area.

It should now be appreciated that a new and improved apparatus for use in a piglet farrowing crate has been described which replaces existing walls or panels in crates and so can be easily retrofitted. Also, as the divider disclosed can easily serve two crates, there is a need for replacing only half the divider panels.

Further, if a heat element such as the pad 210 fails, it can be easily replaced in the field without replacing the entire unit. Similarly, if the heat element 120 fails, the entire base unit can be replaced in the field or just the heat element itself. The described units are both corrosion-free, easily removed by lifting them out of the crib, and require no hardware or extra supports and can be dropped in as replacements for many conventional divider or end panels.

While particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

What is claimed as the invention is:

1. Weaning apparatus for use in a piglet farrowing crate comprising a combined feeder/medicator and wall, comprising an elongated base having heater means incorporated therein for providing an area of heated surface on either side of the base, said base extending longitudinally for several feet and serving as the base of a wall between adjacent crate creep areas;

a feeder comprising an area atop said base into which dry feed may be exposed for the feeding of piglets and means defining a gravity feeding chamber which can be filled with piglet feed and from which piglet feed may flow to said area as feed is consumed from said area, said chamber defining means also defining a wall above part of the length of said base;

a liquid dispenser from which piglets may drink including means defining a liquid chamber for holding a supply of liquid, said dispenser and means for defining said liquid chamber forming a wall above an adjacent length of said base.

2. In a farrowing facility having at least two adjacent farrowing crates, each for confining of a sow and litter, the improvement in a common separating wall structure for separating the adjacent crates, an outer side having a surface forming both ends of said crate, wherein the wall structure includes:

a) a heated elongated base against which piglets may lie;

b) a solid feed dispensing means defined above said base and accessible to the piglets;

c) a bin means for holding solid feed and allowing the feed to be fed into said solid feed dispensing means, said bin means being mounted above said base and also defining part of at least one of the side surfaces of the wall structure;

d) means for dispensing liquid to said piglets mounting in the wall standing above said base and adjacent to said solid feed dispensing means and a reservoir means for holding liquid and supplying it to said liquid dispensing means, said reservoir means also defining part of at least one of the outer surfaces of the wall structure;

whereby said liquid reservoir means and said solid feed bin means help define the side wall surface of the wall structure and serve to supply liquid and solid feed to piglets in close approximation to the warming base to and in weaning the piglets from their sow's milk.

3. The farrowing facility of claim 2, wherein said solid feed dispensing means is accessible by piglets from either of the sides of said wall structure;

said solid feed bin means has sidewalls that define part of the outer side surfaces of the common separating wall structure; and said liquid reservoir means provides liquid to the dispensing means on both side surfaces of the wall structure and has reservoir means defining part of both of the outer surfaces of the wall structure.

4. A removable side wall structure for dividing a pair of adjacent farrowing crates, said dividing side wall structure comprising:

a base extending the length of the crates and defining areas on either side thereof against which piglets may huddle;

means for heating said areas of said base along a substantial part of their lengths so as to provide a heated huddling area for piglets;

a solid feed bin mounted above said base and which forms part of the side of the removable dividing side wall structure, said feed bin feeding solid feed to a trough that is also built into the dividing side wall structure and which trough is accessible to piglets;

a liquid reservoir mounted on said base adjacent to said feed bin and which also forms part of the side of the side wall structure; and means for dispensing liquid from said reservoir, said means being positioned above said base so as to be accessible to piglets.

5. The side wall structure as defined in claim 4 wherein said feed bin and said liquid reservoir together extend for substantially the length of the wall structure and define the major portion of the side of said structure above said base.

6. A divider unit between adjacent creep areas of farrowing crates with built-in heater at and along the base of the divider unit and a source of food and drink for piglets incorporated within the divider unit whereby piglets in either or both of the adjacent creep areas may huddle against the heated base and also feed and drink from said source of food and drink incorporated into the divider unit.

* * * * *